(12) United States Patent
Shiga

(10) Patent No.: US 10,432,732 B2
(45) Date of Patent: Oct. 1, 2019

(54) TERMINAL DEVICE PROVIDING NORMAL AND SECURITY MODES FOR ACCESS TO ONLINE SERVICES

(71) Applicant: KYOCERA CORPORATION, Kyoto (JP)

(72) Inventor: Noritake Shiga, Kyoto (JP)

(73) Assignee: KYOCERA CORPORATION, Kyoto (JP)

(*) Notice: Subject to any disclaimer, the term of this patent is extended or adjusted under 35 U.S.C. 154(b) by 670 days.

(21) Appl. No.: 15/163,514

(22) Filed: May 24, 2016

(65) Prior Publication Data

US 2016/0352837 A1 Dec. 1, 2016

(30) Foreign Application Priority Data

May 27, 2015 (JP) ................................. 2015-107313

(51) Int. Cl.
| | | |
|---|---|---|
| *H04L 29/08* | (2006.01) | |
| *H04L 9/32* | (2006.01) | |
| *H04L 29/06* | (2006.01) | |
| *G06Q 20/40* | (2012.01) | |
| *G06Q 20/36* | (2012.01) | |
| *H04W 4/80* | (2018.01) | |
| *H04W 84/12* | (2009.01) | |
| *H04W 88/08* | (2009.01) | |

(52) U.S. Cl.
CPC ....... *H04L 67/141* (2013.01); *G06Q 20/3674* (2013.01); *G06Q 20/409* (2013.01); *H04L 9/3234* (2013.01); *H04L 29/06802* (2013.01); *H04L 67/306* (2013.01); *H04W 4/80* (2018.02); *H04W 84/12* (2013.01); *H04W 88/08* (2013.01)

(58) Field of Classification Search
CPC .............. G06Q 20/3674; G06Q 20/409; H04L 9/3234; H04L 29/06802
See application file for complete search history.

(56) References Cited

U.S. PATENT DOCUMENTS

| | | | | |
|---|---|---|---|---|
| 6,219,790 B1* | 4/2001 | Lloyd | ..................... | G06F 21/31 726/14 |
| 7,865,937 B1* | 1/2011 | White | ................ | G06Q 20/3674 705/67 |
| 7,941,669 B2* | 5/2011 | Foley | .................... | H04L 63/083 713/182 |
| 8,321,922 B1* | 11/2012 | Lo | ........................... | G06F 21/43 726/7 |
| 8,478,195 B1* | 7/2013 | Hewinson | ............ | H04B 5/0031 235/379 |

(Continued)

FOREIGN PATENT DOCUMENTS

JP   A 2000-040064   2/2000

*Primary Examiner* — George C Neurauter, Jr.
(74) *Attorney, Agent, or Firm* — Duane Morris LLP

(57) ABSTRACT

At least one processor is configured to cause a communication unit to transmit log-in request including an account and designation of a security mode to a service server via a relay device when the security mode is set and to transmit a log-in request including an account and designation of a normal mode to the service server via the relay device when the normal mode is set. The at least one processor is configured to the communication unit to log in the service server when permission of the log-in request is received from the service server via the relay device.

9 Claims, 19 Drawing Sheets

(56) References Cited

U.S. PATENT DOCUMENTS

| | | | | |
|---|---|---|---|---|
| 8,478,196 B1* | 7/2013 | Hewinson | H04B 5/0031 | 235/379 |
| 8,621,590 B2* | 12/2013 | Hoggan | H04W 12/06 | 726/8 |
| 8,880,027 B1* | 11/2014 | Darringer | G06F 21/35 | 455/41.1 |
| 8,881,251 B1* | 11/2014 | Hilger | H04L 63/083 | 713/183 |
| 9,002,270 B1* | 4/2015 | Hewinson | H04B 5/0031 | 340/572.1 |
| 9,066,227 B2* | 6/2015 | Spencer | H04W 12/06 | |
| 9,148,786 B2* | 9/2015 | Singh | H04W 12/08 | |
| 9,185,560 B2* | 11/2015 | Schmidt | H04L 63/061 | |
| 9,204,365 B2* | 12/2015 | Singh | H04W 12/08 | |
| 9,231,660 B1* | 1/2016 | Foster | H04B 17/0085 | |
| 9,332,007 B2* | 5/2016 | Robison, Jr. | H04L 63/0838 | |
| 9,363,251 B2* | 6/2016 | Morikuni | H04L 63/08 | |
| 9,461,991 B2* | 10/2016 | Brand | H04L 63/0853 | |
| 9,552,472 B2* | 1/2017 | Adams | G06F 21/74 | |
| 9,578,011 B2* | 2/2017 | Alison | H04W 4/21 | |
| 9,590,884 B2* | 3/2017 | Toksvig | H04W 4/21 | |
| 9,729,547 B2* | 8/2017 | Morikuni | H04L 63/08 | |
| 9,930,613 B2* | 3/2018 | Starsinic | H04W 4/70 | |
| 2006/0005032 A1* | 1/2006 | Cain | H04L 63/105 | 713/182 |
| 2006/0107217 A1* | 5/2006 | Lu | G06F 21/31 | 715/733 |
| 2006/0183462 A1* | 8/2006 | Kolehmainen | H04B 5/00 | 455/411 |
| 2008/0091723 A1* | 4/2008 | Zuckerberg | G06F 17/30265 | |
| 2009/0187983 A1* | 7/2009 | Zerfos | H04L 63/0823 | 726/10 |
| 2010/0040233 A1* | 2/2010 | Ganapathy | H04L 63/08 | 380/277 |
| 2011/0212707 A1* | 9/2011 | Mahalal | G06Q 20/32 | 455/411 |
| 2011/0225632 A1* | 9/2011 | Ropolyi | H04W 48/16 | 726/4 |
| 2011/0270751 A1* | 11/2011 | Csinger | G06F 21/40 | 705/42 |
| 2013/0283189 A1* | 10/2013 | Basso | H04L 65/403 | 715/753 |
| 2014/0310416 A1* | 10/2014 | Durbha | H04L 47/70 | 709/225 |
| 2015/0281227 A1* | 10/2015 | Fox Ivey | H04L 63/0853 | 713/168 |
| 2015/0381611 A1* | 12/2015 | Mestanov | H04L 63/0853 | 726/6 |
| 2016/0182514 A1* | 6/2016 | Golaup | H04W 12/06 | 726/4 |
| 2016/0183089 A1* | 6/2016 | Pudney | H04W 12/06 | 726/3 |
| 2016/0294785 A1* | 10/2016 | Lim | G06F 21/6209 | |
| 2017/0005775 A1* | 1/2017 | Cheng | H04L 5/0098 | |
| 2017/0289168 A1* | 10/2017 | Bar | H04L 63/0853 | |
| 2019/0149990 A1* | 5/2019 | Wang | H04W 12/06 | |

* cited by examiner

TERMINAL DEVICE PROVIDING NORMAL AND SECURITY MODES FOR ACCESS TO ONLINE SERVICES

CROSS-REFERENCE TO RELATED APPLICATION

The present application claims priority under 35 U.S.C. § 119 to Japanese Patent Application No. 2015-107313 filed on May 27, 2015, entitled "Terminal Device and Service Server." The content of which is incorporated by reference herein in its entirety.

FIELD

The present disclosure relates to a terminal device.

BACKGROUND

When a terminal device logs in a service server which provides a social networking service (SNS) or a service dedicated for members, the terminal device transmits an account to the service server, and the service server authenticates the received account and permits log-in when authentication is successful. When an account leaks, others can impersonate an authorized person and can use an SNS service.

SUMMARY

A terminal device which logs in a service server according to one embodiment includes a communication unit configured to establish connection for communication with the service server via a relay device. The terminal device further includes at least one processor configured to set a normal mode or a security mode for an access to the service server. The at least one processor is configured to cause the communication unit to transmit a log-in request including an account and designation of the security mode to the service server via the relay device when the security mode is set and to transmit a log-in request including an account and designation of the normal mode to the service server via the relay device when the normal mode is set. The at least one processor is configured to cause the communication unit to log in the service server when permission of the log-in request is received from the service server via the relay device. When the service server is not logged in with a first account, a log-in request including the first account and designation of the security mode is permitted by the service server and the service server is set to the security mode. Another log-in request including an account the same as the first account is permitted by the service server set to the security mode when another log-in request passes via a relay device the same as the relay device to which the terminal device which has logged in with the first account is connected.

A terminal device which logs in a service server according to one embodiment includes a first communication unit configured to establish connection for communication with the service server via a relay device and a second communication unit configured to establish connection for communication with near field communication equipment. The terminal device further includes at least one processor configured to cause the first communication unit to transmit to the service server, a log-in request including an account and designation of an identifier of near field communication equipment connected via the second communication unit. The at least one processor is configured to cause the first communication unit to log in the service server when permission of the log-in request is received from the service server. When the service server is not logged in with a first account, a log-in request including the first account is permitted by the service server. When an identifier of near field communication equipment included in another log-in request including an account the same as the first account is the same as the identifier of near field communication equipment included in the log-in request from the terminal device which has logged in with the first account, the service server permits another log-in request.

A terminal device which logs in a service server according to one embodiment includes a first communication unit configured to establish connection for communication with the service server via a relay device and a second communication unit configured to establish connection for communication with near field communication equipment. The terminal device further includes at least one processor configured to cause the first communication unit to transmit to the service server, a log-in request including an account and designation of an identifier of near field communication equipment connected via the second communication unit. The at least one processor is configured to cause the first communication unit to log in the service server when permission of the log-in request is received from the service server. The log-in request is permitted when a combination of the account and the identifier of the near field communication equipment included in the log-in request is registered in the service server.

DETAILED DESCRIPTION

A form of the present disclosure will be described below with reference to the drawings.

First Embodiment

Figure 1:
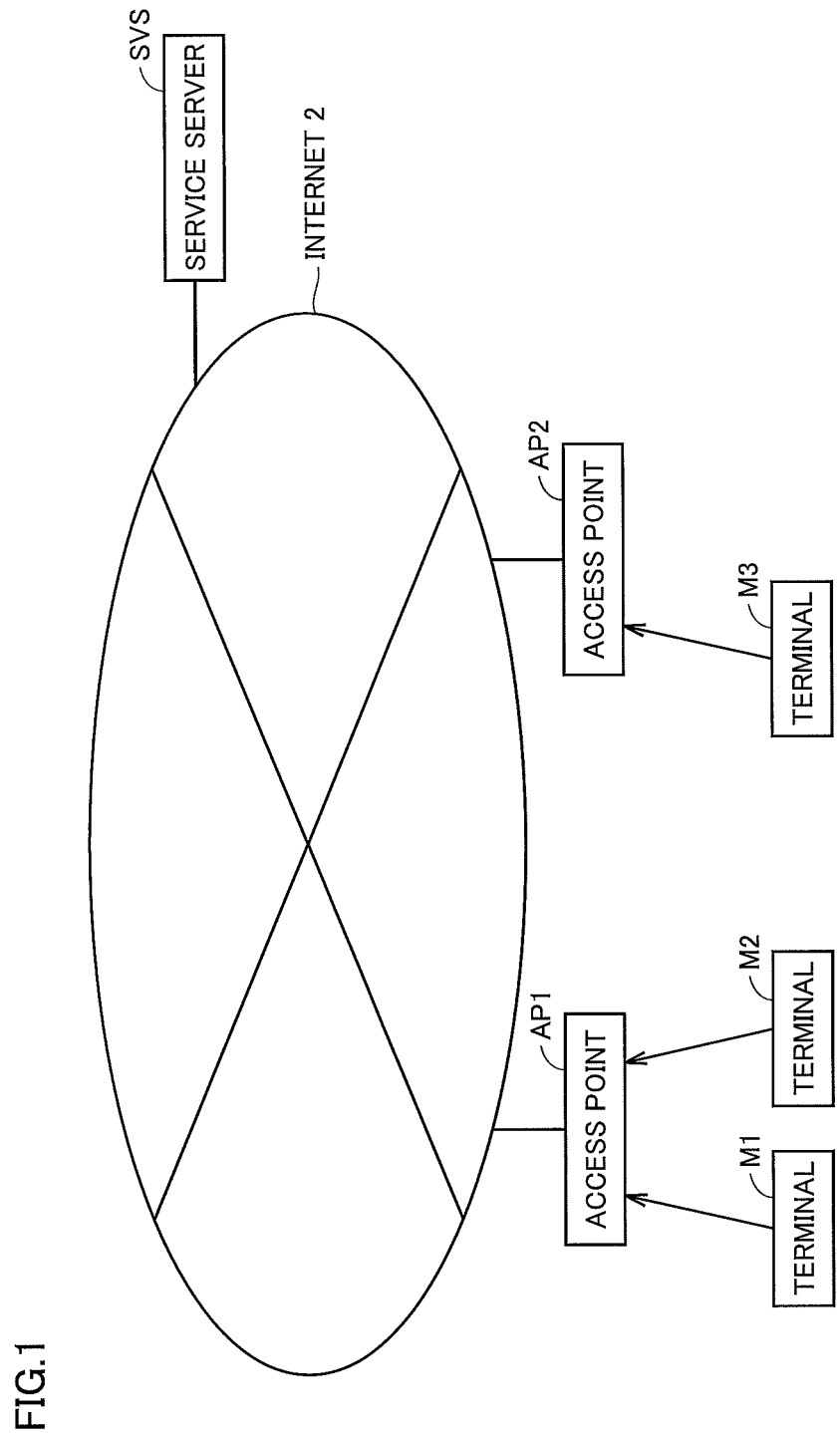
FIG. 1 is a diagram for illustrating processing of a log-in request from a terminal device in a first embodiment.

FIG. 1 is a diagram for illustrating processing of a log-in request from a terminal device in a first embodiment.

As shown in FIG. 1, a service server SVS such as a domain server for a social network or a server for online shopping and Wi-Fi (wireless fidelity) access points AP1 and AP2 under IEEE 802.11 such as a Wi-Fi router are connected to the Internet 2. Terminal devices M1, M2 and M3 such as a smartphone, a personal computer, and a tablet terminal have the same account AC and request for log-in to service server SVS.

Access point AP1 functions as a device for relay of communication between terminal devices M1 and M2 and service server SVS. Access point AP2 functions as a device for relay of communication between terminal device M3 and service server SVS. Communication for local area is established between access point AP1 and terminal devices M1 and M2 and between access point AP2 and terminal device M3. Communication for wide area is established between access point AP1 and service server SVS and between access point AP2 and service server SVS.

In the first embodiment, log-in to service server SVS by an authorized user from a plurality of terminal devices can be permitted in a relatively narrow area such as a house, however, unauthorized log-in to service server SVS by an unauthorized user who is present at a remote location and has stolen an account can be rejected.

In such a situation, a log-in request is permitted and rejected as below.

Initially, when terminal device M1 requests for log-in to service server SVS via access point AP1, the log-in request is permitted because the service server is not logged in with an account AC. Namely, a first log-in request with account AC while the service server is not logged in with account AC is regarded as a log-in request from an authorized user.

Then, when terminal device M2 requests for log-in to service server SVS via access point AP1, the log-in request is permitted because access point AP1 to which terminal device M1 which has logged in is connected and access point AP1 via which the log-in request from terminal device M2 passes match with each other, although the service server has been logged in with account AC.

When terminal device M3 requests for log-in to service server SVS via access point AP2, the log-in request is rejected because the service server has already been logged in with account AC and access point AP1 to which terminal device M1 which has logged in is connected and access point AP2 via which the log-in request from terminal device M3 passes are different from each other.

Namely, when terminal device M1 has initially logged in service server SVS, a log-in request from terminal device M2 which has passed via access point AP1 the same as access point AP1 connected to terminal device M1 is permitted, however, a log-in request from terminal device M3 which has passed via access point AP2 different from access point AP1 connected to terminal device M1 is rejected.

Figure 2:
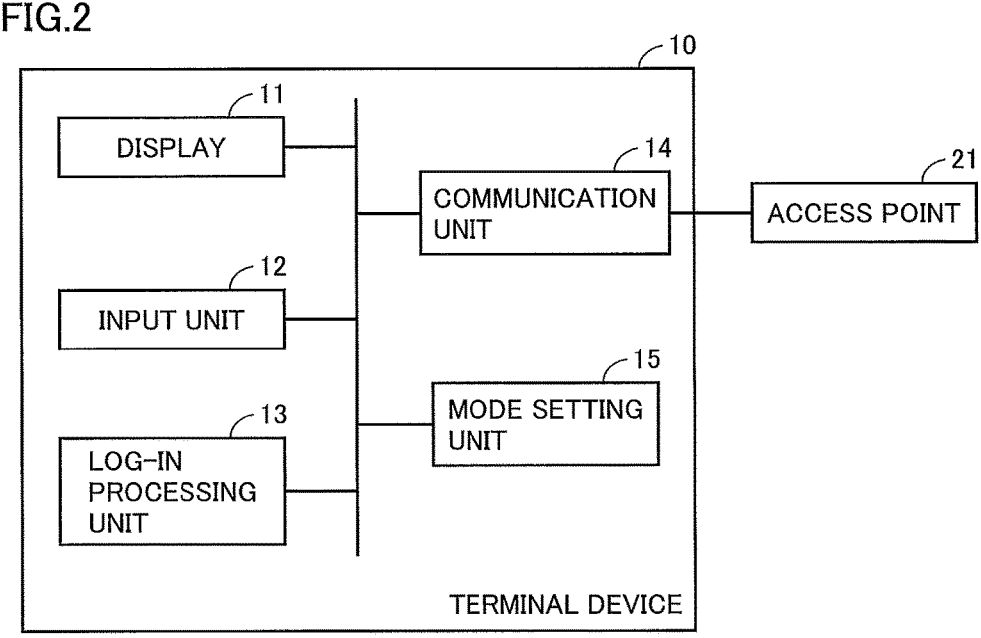
FIG. 2 is a diagram showing a configuration of the terminal device in the first embodiment.

FIG. 2 is a diagram showing a configuration of terminal device 10 in the first embodiment.

Referring to FIG. 2, terminal device 10 includes a display 11, an input unit 12, a log-in processing unit 13, a communication unit 14, and a mode setting unit 15. Log-in processing unit 13 and mode setting unit 15 can be implemented by at least one processor such as a CPU (Central Processing Unit) executing programs restored in a memory. In accordance with various embodiments, the at least one processor may be implemented as a single integrated circuit (IC) or as multiple communicatively coupled IC's and/or discrete circuits. It is appreciated that the at least one processor can be implemented in accordance with various known technologies. In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

Mode setting unit 15 can set a normal mode or a security mode for an access to a service server 30.

Display 11 can show a result of a log-in request. Display 11 is implemented, for example, by a liquid crystal display or an organic electro-luminescence (EL) display.

Input unit 12 can accept an input from a user. Input unit 12 is implemented, for example, by a touch panel which detects contact or proximity of an object (such as a finger of a user or a pen) based on a capacitance or a touch panel which detects an input by a user based on infrared rays or electromagnetic induction.

Communication unit 14 can establish connection for communication with an access point 21 and can communicate with service server 30 through access point 21 and the Internet 2.

Log-in processing unit 13 can transmit a log-in request including an account and designation of the security mode to service server 30 via access point 21 when the security mode is set. Log-in processing unit 13 can transmit a log-in request including an account and designation of the normal mode to service server 30 via access point 21 when the normal mode is set. The account is constituted of a user ID and a password. When log-in processing unit 13 receives permission of the log-in request from service server 30 via access point 21, it can log in service server 30.

Figure 3:
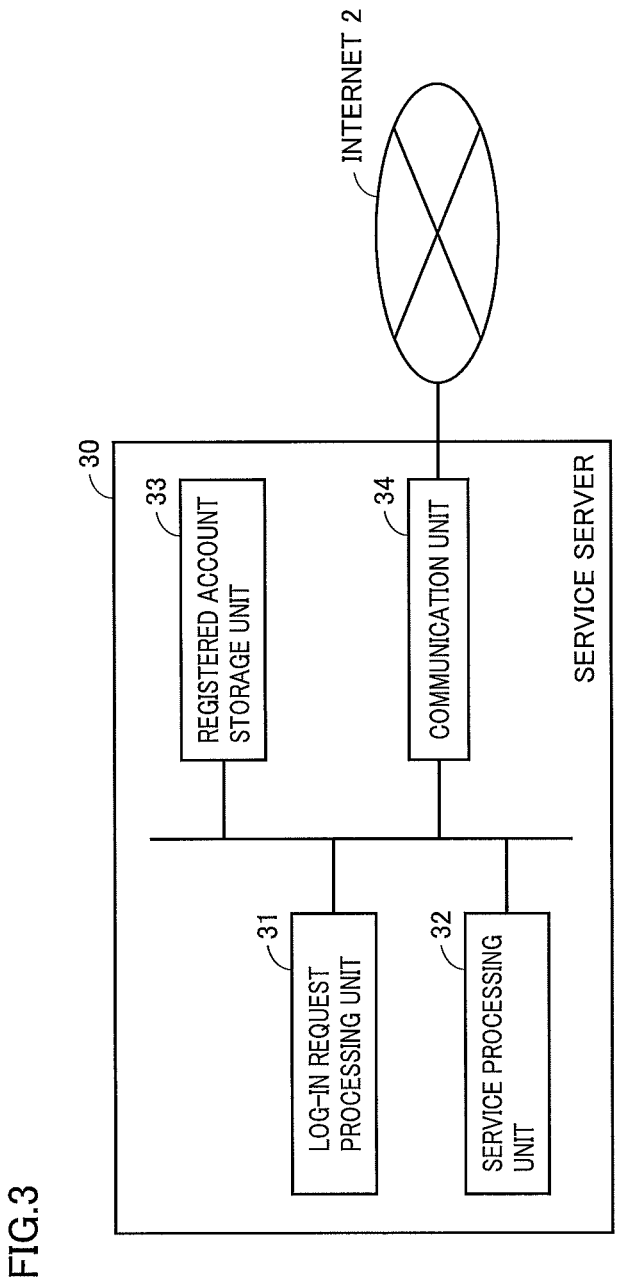
FIG. 3 is a diagram showing a configuration of a service server in the first embodiment.

FIG. 3 is a diagram showing a configuration of service server 30 in the first embodiment.

Referring to FIG. 3, service server 30 includes a log-in request processing unit 31, a service processing unit 32, a registered account storage unit 33, and a communication unit 34. Log-in request processing unit 31 and service processing unit 32 can be implemented by at least one processor such as a CPU executing programs restored in a memory.

Service processing unit 32 can perform processing in accordance with a request from a user of which log-in has been permitted.

Registered account storage unit 33 can store a registered account of a user.

Communication unit 34 can communicate with terminal device 10 through the Internet 2 and access point 21.

Log-in request processing unit 31 can permit or reject a log-in request from terminal device 10. Log-in request processing unit 31 can receive a log-in request including an account and designation of the security mode or a log-in request including an account and designation of the normal mode from terminal device 10 via access point 21 and the Internet 2. When a first account included in the received log-in request has been stored in registered account storage unit 33 and service server 30 is not logged in with the first account, log-in request processing unit 31 can permit the log-in request including the first account and designation of the security mode and set service server 30 to the security mode. When an access point via which another log-in request including an account the same as the first account received after setting to the security mode passes is the same as the access point to which the terminal device which has logged in with the first account is connected, log-in request processing unit 31 can permit another log-in request. Whether or not the access points are the same can be determined based on whether or not wide area network-Internet protocol (WAN-IP) addresses of access points are the same.

Figure 4:
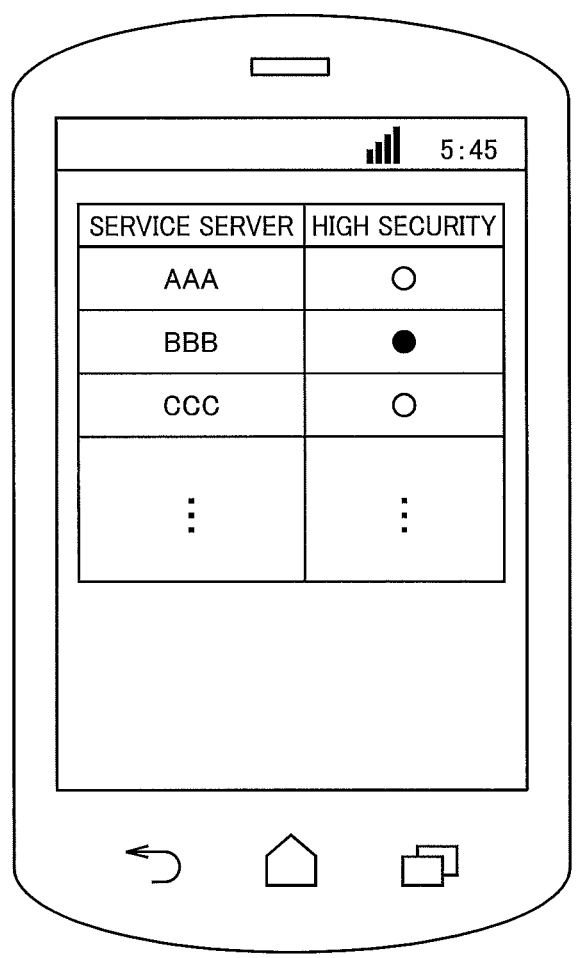
FIG. 4 is a diagram showing an example of mode setting.

FIG. 4 is a diagram showing an example of mode setting.

Display 11 of terminal device 10 shows a screen as in FIG. 4. A user can set a mode to the security mode or the normal mode for each service server for which the user has an account. In an example in FIG. 4, the normal mode is set by default, and the user can change the mode of the service server from the normal mode to the security mode by touching a portion lateral to a name of a service server of which mode is desirably set to the security mode.

Figure 5:
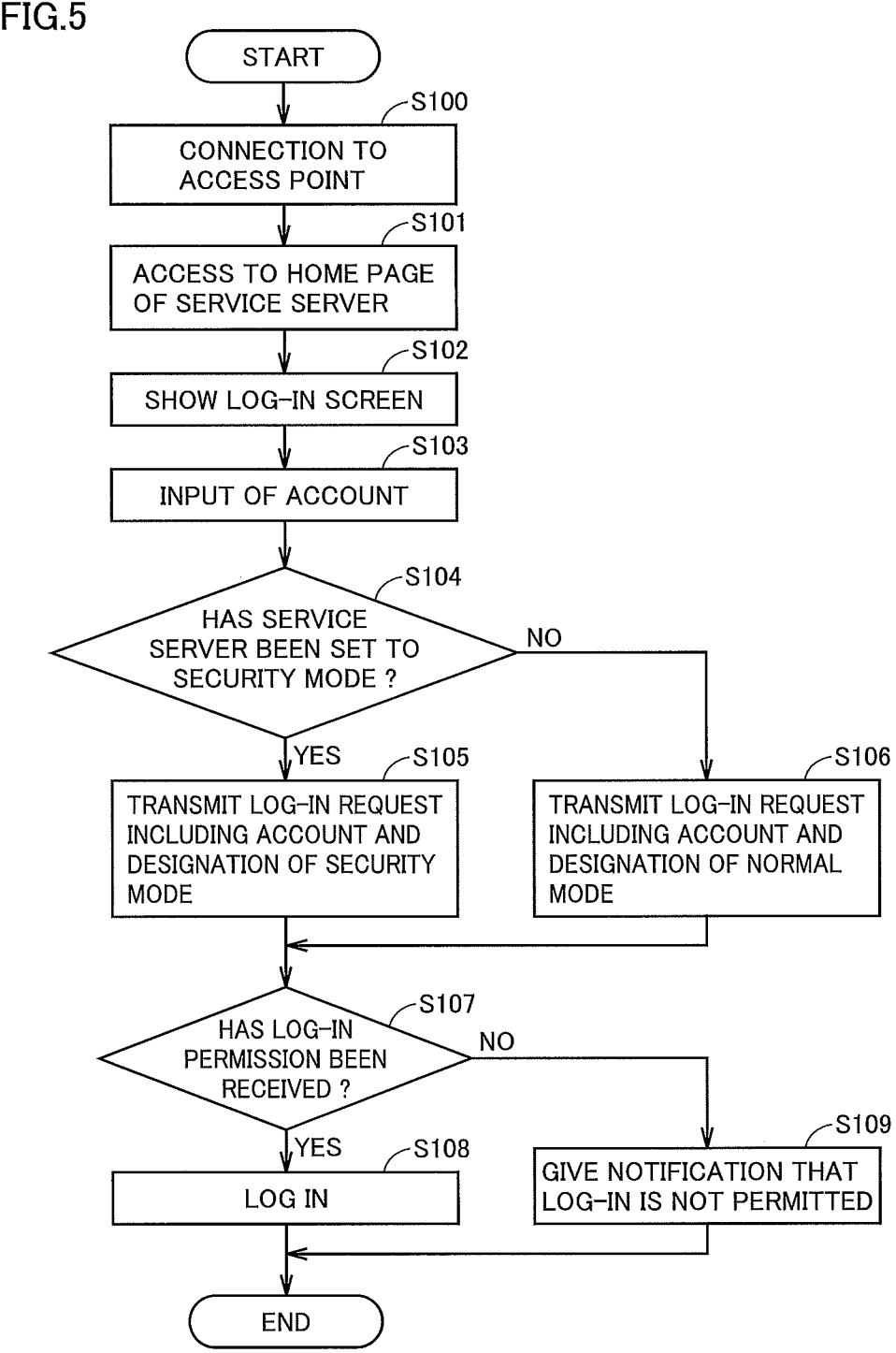
FIG. 5 is a flowchart showing a log-in procedure in the terminal device in the first embodiment.

FIG. 5 is a flowchart showing a log-in procedure in terminal device 10 in the first embodiment.

Referring to FIG. 5, in step S100, communication unit 14 can establish connection for communication with access point 21.

In step S101, log-in processing unit 13 can obtain a log-in screen by accessing a home page of service server 30.

In step S102, log-in processing unit 13 can have display 11 show a log-in screen.

In step S103, log-in processing unit 13 can accept an input of an account from a user through input unit 12.

When the security mode has been set in step S104, the process proceeds to step S105, and when the normal mode has been set, the process proceeds to step S106.

In step S105, log-in processing unit 13 can transmit a log-in request including the account input by the user and designation of the security mode to service server 30 through communication unit 14 via access point 21.

In step S106, log-in processing unit 13 can transmit a log-in request including the account input by the user and designation of the normal mode to service server 30 through communication unit 14 via access point 21.

In step S107, when log-in processing unit 13 receives through communication unit 14, a log-in permission notification transmitted from service server 30 via access point 21, the process proceeds to step S108. When log-in processing unit 13 receives through communication unit 14, a log-in rejection notification transmitted from service server 30 via access point 21, the process proceeds to step S109.

In step S108, log-in processing unit 13 can log in service server 30 and have display 11 show success in log-in.

In step S109, log-in processing unit 13 can have display 11 show failure in log-in.

Figure 6:
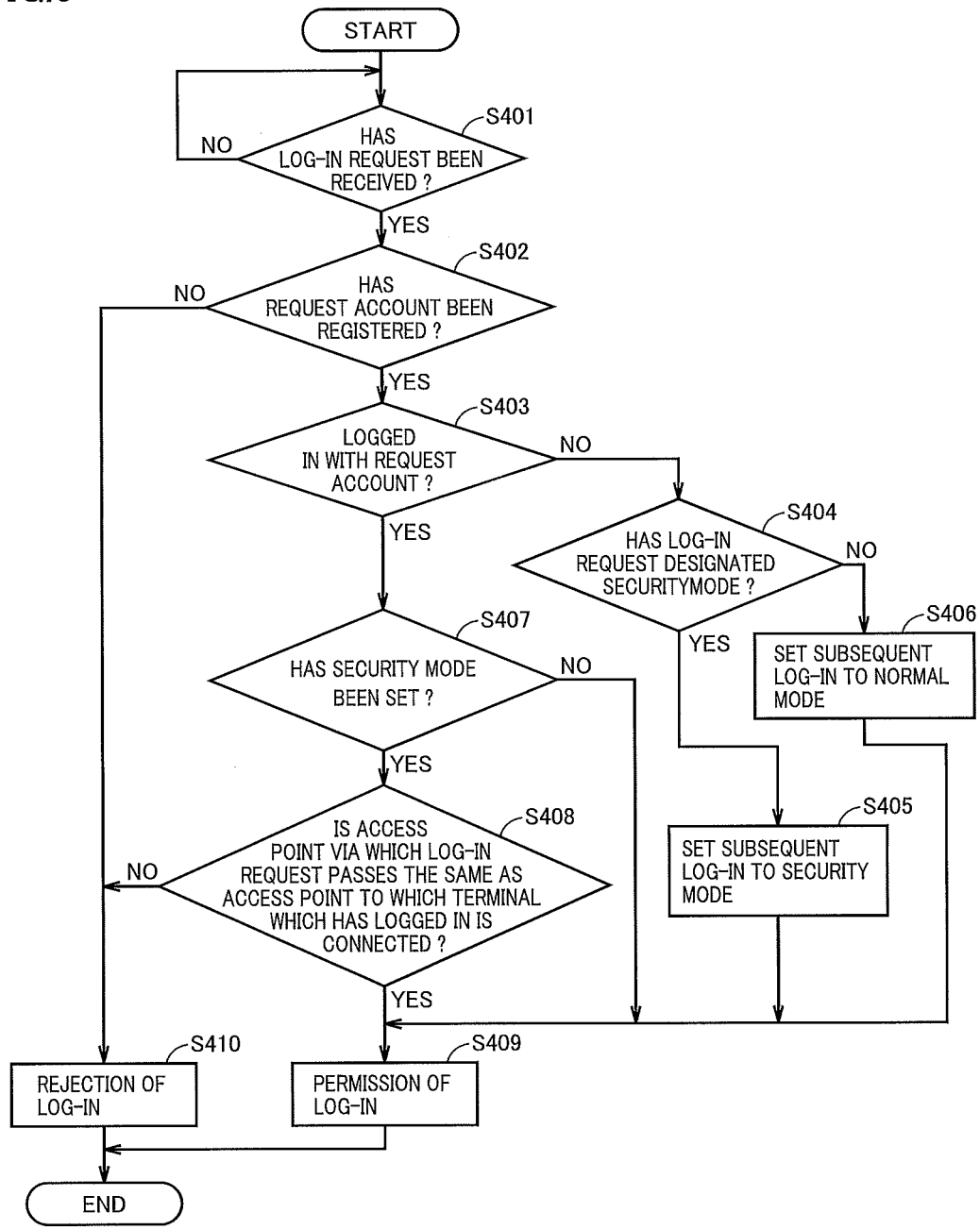
FIG. 6 is a flowchart showing a procedure for processing of a log-in request in the service server in the first embodiment.

FIG. 6 is a flowchart showing a procedure for processing of a log-in request in service server 30 in the first embodiment.

In step S401, when log-in request processing unit 31 receives through communication unit 34, a log-in request transmitted from terminal device 10 via access point 21, the process proceeds to step S402.

When an account included in the received log-in request (hereinafter a request account) is stored in registered account storage unit 33 in step S402, log-in request processing unit 31 allows the process to proceed to step S403, and when the request account is not stored in registered account storage unit 33, it allows the process to proceed to step S410.

When log-in with the request account has already been successful (hereinafter in a log-in state) in step S403, log-in request processing unit 31 can allow the process to proceed to step S407, and when not in the log-in state, it can allow the process to proceed to step S404.

In step S404, when the received log-in request includes designation of the security mode, log-in request processing unit 31 allows the process to proceed to step S405, and when the received log-in request includes designation of the normal mode or does not include designation of a mode, it allows the process to proceed to step S406.

In step S405, log-in request processing unit 31 can set a subsequent mode to the security mode. Thereafter, the process proceeds to step S409.

In step S406, log-in request processing unit 31 can set a subsequent mode to the normal mode. Thereafter, the process proceeds to step S409.

When the security mode is currently set in step S407, the process proceeds to step S408. When the normal mode is currently set, the process proceeds to step S409.

In step S408, when the access point via which the log-in request passes is the same as the access point to which the terminal device which has logged in with the request account is connected, the process proceeds to step S409, and when it is not the same, the process proceeds to step S410.

In step S409, log-in request processing unit 31 can permit log-in of the terminal device which has transmitted the log-in request and can transmit through communication unit 34, a log-in permission notification to terminal device 10 via access point 21.

In step S410, log-in request processing unit 31 can reject log-in of the terminal device which has transmitted the log-in request, and can transmit through communication unit 34, a log-in rejection notification to terminal device 10 via access point 21.

As set forth above, according to the first embodiment, unauthorized log-in to a service server with a leaked account from an access point different from an access point of a terminal device used by an authorized user while the authorized user has logged in the service server can be prevented. Thus, takeover by an unauthorized user of a social networking service can be prevented.

Second Embodiment

Figure 7:
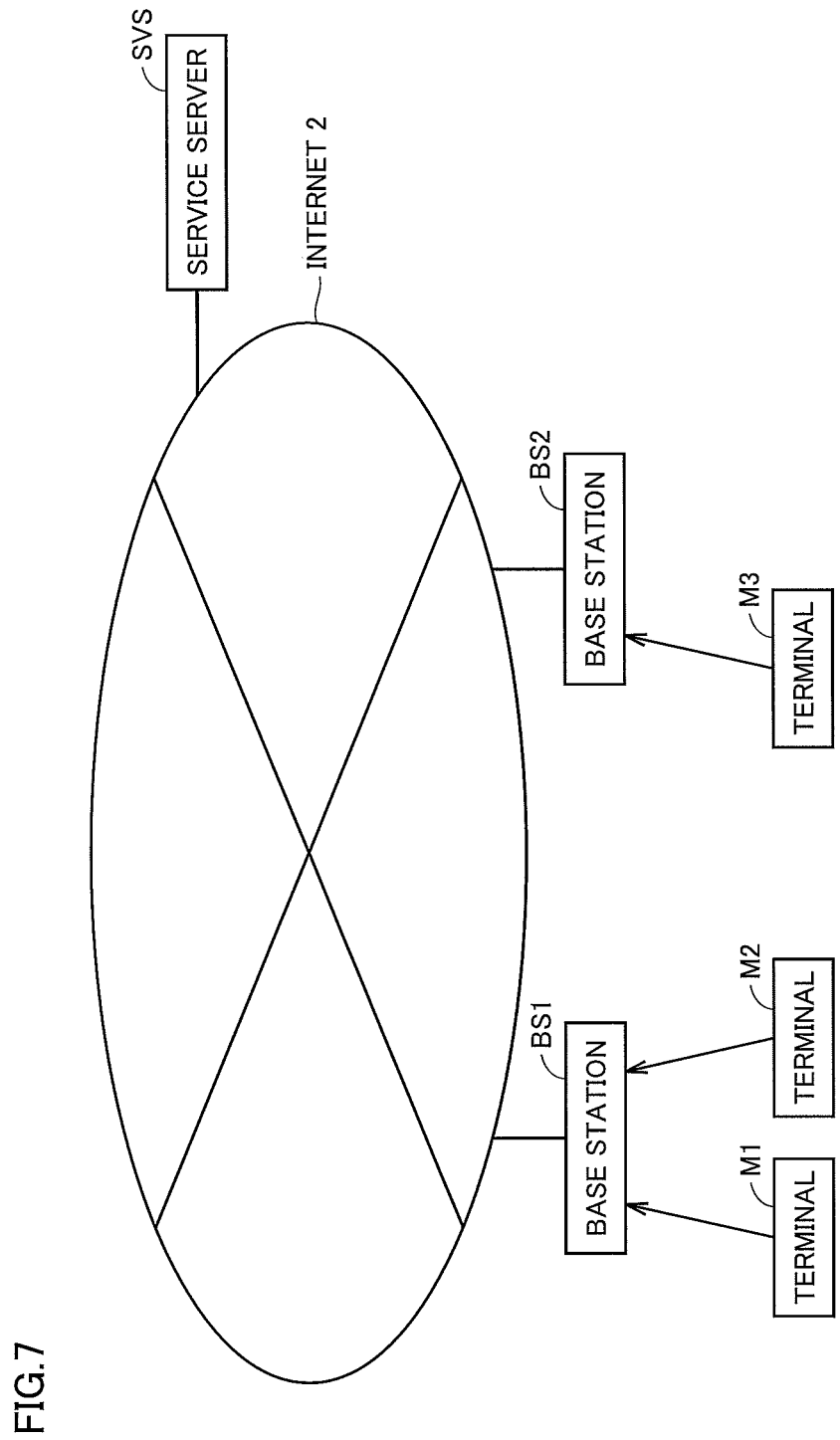
FIG. 7 is a diagram for illustrating processing of a log-in request from the terminal device in a second embodiment.

FIG. 7 is a diagram for illustrating processing of a log-in request from the terminal device in a second embodiment.

As shown in FIG. 7, service server SVS and base stations BS1 and BS2 for portable telephones are connected to the Internet 2. Terminal devices M1, M2 and M3 have the same account AC and request for log-in to service server SVS.

Base station BS1 functions as a device for relay of communication between terminal devices M1 and M2 and service server SVS. Base station BS2 functions as a device for relay of communication between terminal device M3 and service server SVS. Communication for local area is established between base station BS1 and terminal devices M1 and M2 and between base station BS2 and terminal device M3. Communication for wide area is established between base station BS1 and service server SVS and between base station BS2 and service server SVS.

In the second embodiment, log-in to service server SVS by an authorized user from a plurality of terminal devices can be permitted in a cell of a portable telephone service, however, unauthorized log-in to service server SVS by an unauthorized user who is present in a different cell and has stolen an account can be rejected.

In such a situation, a log-in request is permitted and rejected as below.

Initially, when terminal device M1 requests for log-in to service server SVS via base station BS1, a log-in request is permitted because the service server is not logged in with account AC. Namely, a first log-in request with account AC with the service server being not logged in with account AC is regarded as a log-in request from an authorized user.

Then, when terminal device M2 requests for log-in to service server SVS via base station BS1, the log-in request is permitted because base station BS1 to which terminal device M1 which has logged in is connected and base station BS1 via which the log-in request from terminal device M2 passes match with each other, although the service server has been logged in with account AC.

When terminal device M3 requests for log-in to service server SVS via base station BS2, that log-in request is rejected because the service server has already been logged in with the request account and base station BS1 to which terminal device M1 which has logged in is connected and base station BS2 via which the log-in request from terminal device M3 passes are different from each other.

Namely, when terminal device M1 has initially logged in service server SVS, a log-in request from terminal device M2 which has passed via base station BS1 the same as base station BS1 connected to terminal device M1 is permitted, however, a log-in request from terminal device M3 which has passed via base station BS2 different from base station BS1 connected to terminal device M1 is rejected.

Figure 8:
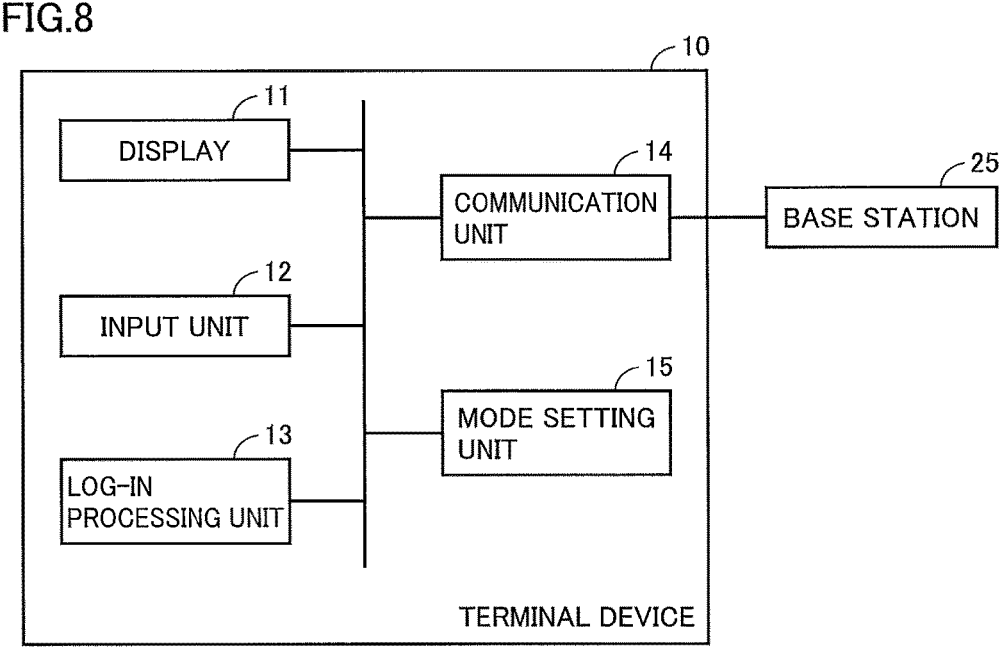
FIG. 8 is a diagram showing a configuration of the terminal device in the second embodiment.

FIG. 8 is a diagram showing a configuration of terminal device 10 in the second embodiment.

Referring to FIG. 8, terminal device 10 includes display 11, input unit 12, log-in processing unit 13, communication unit 14, and mode setting unit 15. Log-in processing unit 13 and mode setting unit 15 can be implemented by at least one processor such as a CPU executing programs restored in a memory.

Mode setting unit 15 can set the normal mode or the security mode for an access to service server 30.

Display 11 can show a result of a log-in request.

Input unit 12 can accept an input from a user.

Communication unit 14 can establish connection for communication with a base station 25 and can communicate with service server 30 through base station 25 and the Internet 2.

Log-in processing unit 13 can transmit a log-in request including an account and designation of the security mode to service server 30 via base station 25 when the security mode is set. Log-in processing unit 13 can transmit a log-in request including an account and designation of the normal mode to service server 30 via base station 25 when the normal mode is set. When log-in processing unit 13 receives permission of the log-in request from service server 30 via base station 25, it can log in service server 30.

Communication unit 34 of service server 30 in the second embodiment can communicate with terminal device 10 through the Internet 2 and base station 25.

Log-in request processing unit 31 of service server 30 in the second embodiment can permit or reject a log-in request from terminal device 10. Log-in request processing unit 31 can receive a log-in request including an account and designation of the security mode or a log-in request including an account and designation of the normal mode from terminal device 10 via base station 25 and the Internet 2. When a first account included in the received log-in request is stored in registered account storage unit 33 and service server 30 is not logged in with the first account, log-in request processing unit 31 can permit the log-in request including the first account and designation of the security mode and set service server 30 to the security mode. When a base station via which another log-in request including an account the same as the first account received after setting to the security mode passes is the same as the base station to which the terminal device which has logged in with the first account is connected, log-in request processing unit 31 can permit another log-in request.

Figure 9:
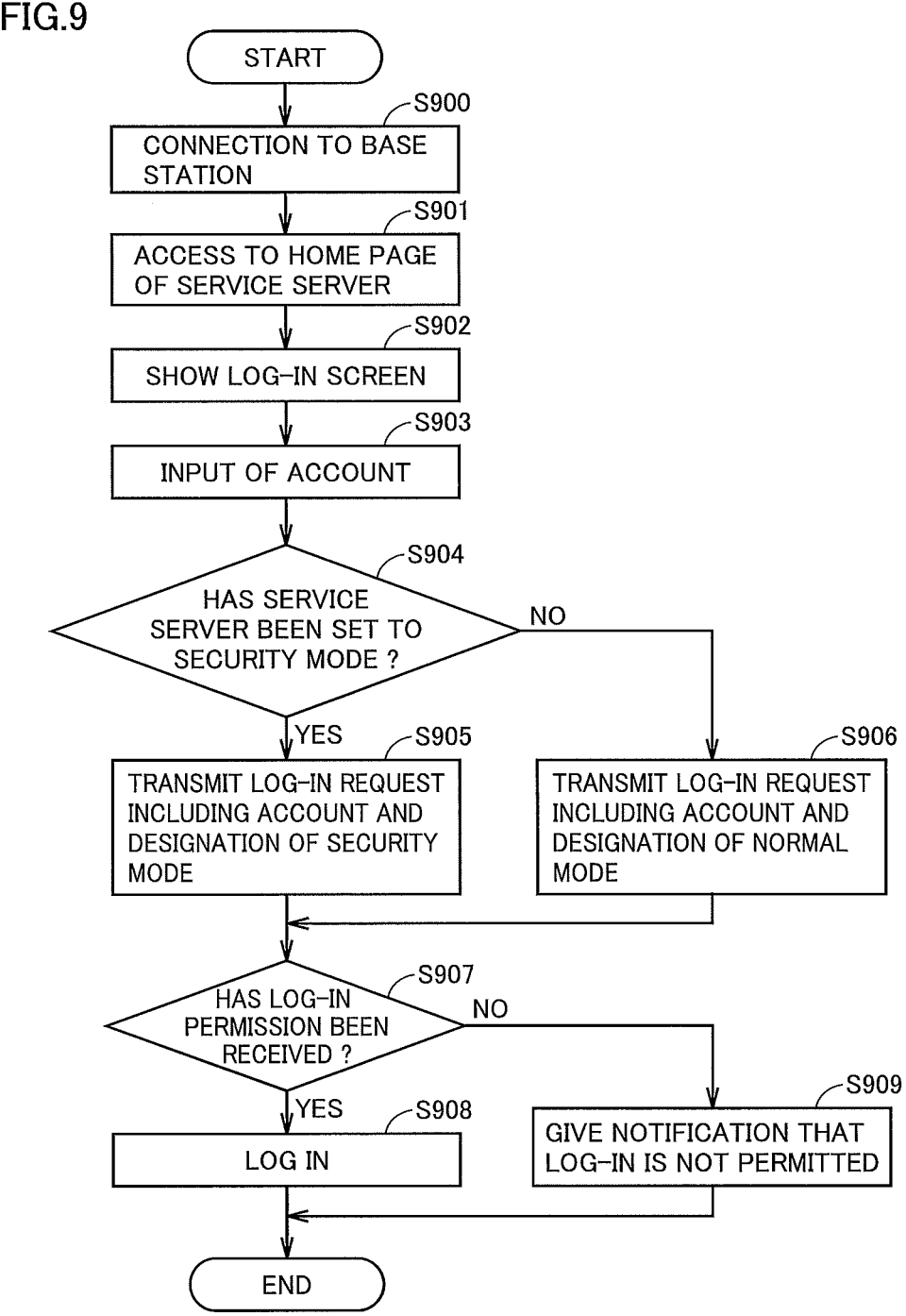
FIG. 9 is a flowchart showing a log-in procedure in the terminal device in the second embodiment.

FIG. 9 is a flowchart showing a log-in procedure in terminal device 10 in the second embodiment.

Referring to FIG. 9, in step S900, communication unit 14 can establish connection for communication with base station 25.

In step S901, log-in processing unit 13 can obtain a log-in screen by accessing a home page of the service server.

In step S902, log-in processing unit 13 can have display 11 show a log-in screen.

In step S903, log-in processing unit 13 can accept an input of an account from a user through input unit 12.

When the security mode has been set in step S904, the process proceeds to step S905, and when the normal mode has been set, the process proceeds to step S906.

In step S905, log-in processing unit 13 can transmit a log-in request including the account input by the user and designation of the security mode to service server 30 through communication unit 14 via base station 25.

In step S906, log-in processing unit 13 can transmit a log-in request including the account input by the user and designation of the normal mode to service server 30 through communication unit 14 via base station 25.

In step S907, when log-in processing unit 13 receives through communication unit 14, a log-in permission notification transmitted from service server 30 via base station 25, the process proceeds to step S908. When log-in processing unit 13 receives through communication unit 14, a log-in rejection notification transmitted from service server 30 via base station 25, the process proceeds to step S908.

In step S908, log-in processing unit 13 can log in service server 30 and can have display 11 show success in log-in.

In step S909, log-in processing unit 13 can have display 11 show failure in log-in.

Figure 10:
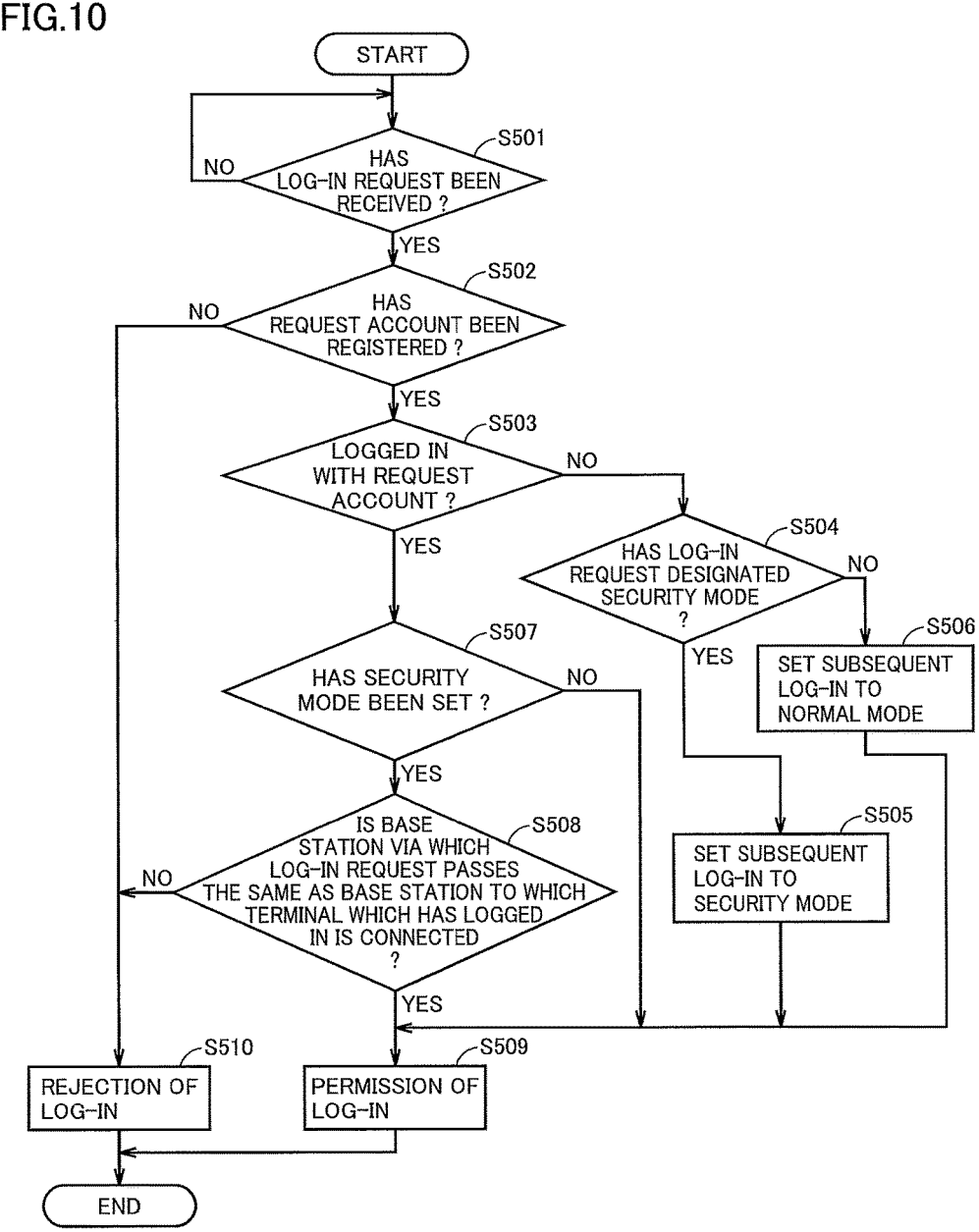
FIG. 10 is a flowchart showing a procedure for processing of a log-in request in the service server in the second embodiment.

FIG. 10 is a flowchart showing a procedure for processing of a log-in request in service server 30 in the second embodiment.

In step S501, when log-in request processing unit 31 receives through communication unit 34, a log-in request transmitted from terminal device 10 via base station 25, the process proceeds to step S502.

When an account included in the received log-in request (hereinafter a request account) is stored in registered account storage unit 33 in step S502, log-in request processing unit 31 allows the process to proceed to step S503, and when the request account is not stored in registered account storage unit 33, it allows the process to proceed to step S510.

When log-in with the request account has already been successful (hereinafter in the log-in state) in step S503, log-in request processing unit 31 can allow the process to proceed to step S507, and when not in the log-in state, it can allow the process to proceed to step S504.

In step S504, when the received log-in request includes designation of the security mode, log-in request processing unit 31 allows the process to proceed to step S505, and when the received log-in request includes designation of the normal mode or does not include designation of a mode, it allows the process to proceed to step S506.

In step S505, log-in request processing unit 31 can set a subsequent mode to the security mode. Thereafter, the process proceeds to step S509.

In step S506, log-in request processing unit 31 can set a subsequent mode to the normal mode. Thereafter, the process proceeds to step S509.

When the security mode is currently set in step S507, the process proceeds to step S508. When the normal mode is currently set, the process proceeds to step S509.

In step S508, when the base station via which the log-in request passes is the same as the base station to which the terminal device which has logged in with the request account is connected, the process proceeds to step S509, and when it is not the same, the process proceeds to step S510.

In step S509, log-in request processing unit 31 can permit log-in of the terminal device which has transmitted the log-in request and can transmit through communication unit 34, a log-in permission notification to terminal device 10 via base station 25.

In step S510, log-in request processing unit 31 can reject log-in of the terminal device which has transmitted the log-in request, and can transmit through communication unit 34, a log-in rejection notification to terminal device 10 via base station 25.

As set forth above, according to the second embodiment, unauthorized log-in to a service server with a leaked account via a base station different from a base station to which a terminal device used by an authorized user is connected while the authorized user has logged in the service server can be prevented. Thus, as in the first embodiment, takeover by an unauthorized user of a social networking service can be prevented.

Third Embodiment

Figure 11:
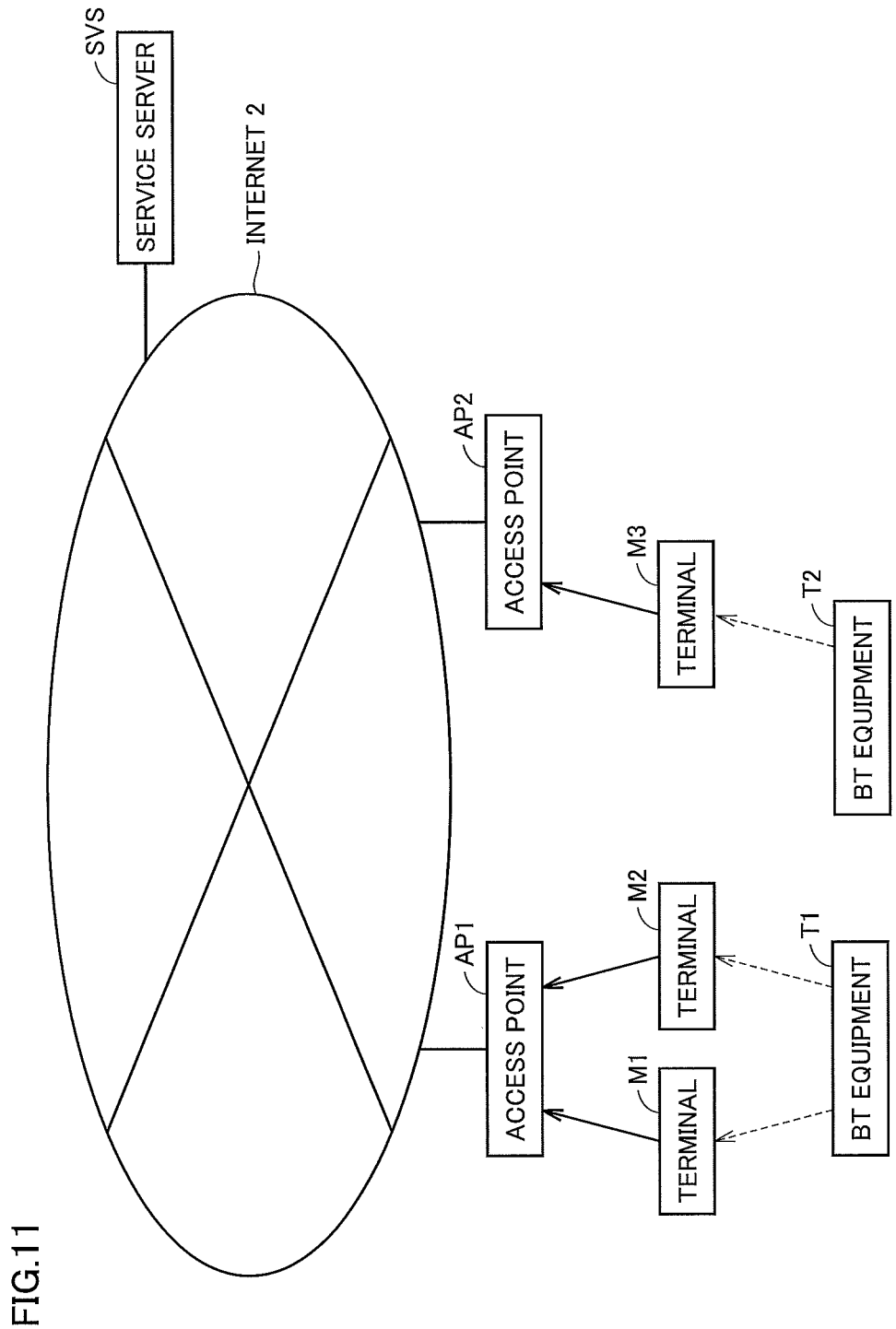
FIG. 11 is a diagram for illustrating processing of a log-in request from the terminal device in a third embodiment.

FIG. 11 is a diagram for illustrating processing of a log-in request from the terminal device in a third embodiment.

As shown in FIG. 11, service server SVS and Wi-Fi access points AP1 and AP2 are connected to the Internet 2. Terminal devices M1, M2 and M3 have the same account AC and request for log-in to service server SVS.

Terminal devices M1 and M2 can communicate with BT equipment T1 under the Bluetooth technology. Terminal device M3 can communicate with BT equipment T2 under the Bluetooth technology. BT equipment T1, T2 is implemented, for example, by a speaker which outputs music data transmitted from terminal devices M1, M2, and M3.

In the third embodiment, log-in to service server SVS by an authorized user from a plurality of terminal devices can be permitted in a relatively narrow area such as a house, however, unauthorized log-in to service server SVS by an unauthorized user who is present at a remote location and has stolen an account can be rejected.

In such a situation, a log-in request is permitted and rejected as below.

Initially, when terminal device M1 requests for log-in to service server SVS via access point AP1, the log-in request is permitted because the service server is not logged in with account AC. Namely, a first log-in request with account AC with the service server being not logged in with account AC is regarded as a log-in request from an authorized user.

Then, when terminal device M2 requests for log-in to service server SVS via access point AP1, the log-in request is permitted because BT equipment T1 to which terminal device M1 which has logged in is connected and BT equipment T1 to which terminal device M2 which has transmitted the log-in request is connected match with each other, although the service server has been logged in with account AC.

When terminal device M3 requests for log-in to service server SVS via access point AP2, the log-in request is rejected because the service server has already been logged in with account AC and BT equipment T1 to which terminal device M1 which has logged in is connected and BT equipment T2 to which terminal device M3 which has transmitted the log-in request is connected are different from each other.

Namely, when terminal device M1 has initially logged in service server SVS, a log-in request from terminal device M2 connected to BT equipment T1 the same as BT equipment T1 connected to terminal device M1 is permitted, however, a log-in request from terminal device M3 connected to BT equipment T2 different from BT equipment T1 connected to terminal device M1 is rejected.

Figure 12:
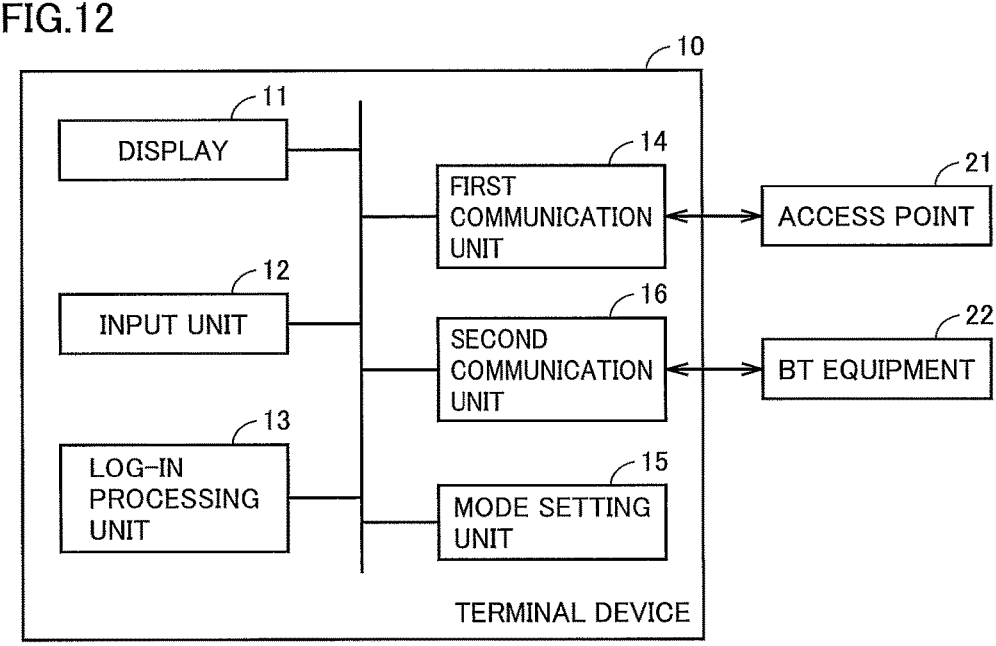
FIG. 12 is a diagram showing a configuration of the terminal device in the third embodiment.

FIG. 12 is a diagram showing a configuration of terminal device 10 in the third embodiment.

Referring to FIG. 12, terminal device 10 includes display 11, input unit 12, log-in processing unit 13, a first communication unit 14, a second communication unit 16, and mode setting unit 15. Log-in processing unit 13 and mode setting unit 15 can be implemented by at least one processor such as a CPU executing programs restored in a memory.

Mode setting unit 15 can set the normal mode or the security mode for an access to service server 30.

Display 11 can show a result of a log-in request.

Input unit 12 can accept an input from a user.

First communication unit 14 can establish connection for communication with access point 21 and can communicate with service server 30 through access point 21 and the Internet 2.

Second communication unit 16 can establish connection for communication with BT equipment 22 and can communicate with BT equipment 22 under the Bluetooth technology.

Log-in processing unit 13 can transmit a log-in request including an account, an ID of connected BT equipment 22, and designation of the security mode to service server 30 via access point 21 when the security mode is set. Log-in processing unit 13 can transmit a log-in request including an account, an ID of connected BT equipment 22, and designation of the normal mode to service server 30 via access point 21 when the normal mode is set. When log-in processing unit 13 receives permission of the log-in request from service server 30 via access point 21, it can log in service server 30.

Communication unit 34 of service server 30 in the third embodiment can communicate with terminal device 10 through the Internet 2 and access point 21.

Log-in request processing unit 31 of service server 30 in the third embodiment can permit or reject a log-in request from terminal device 10. Log-in request processing unit 31 can receive a log-in request including an account, an ID of BT equipment, and designation of the security mode or a log-in request including an account, an ID of BT equipment, and designation of the normal mode from terminal device 10 via access point 21 and the Internet 2. When a first account included in the received log-in request is stored in registered account storage unit 33 and service server 30 is not logged in with the first account, log-in request processing unit 31 can permit the log-in request including the first account and designation of the security mode and set service server 30 to the security mode. When an ID of BT equipment included in another log-in request including an account the same as the first account received after setting to the security mode is the same as the ID of the BT equipment included in the log-in request from the terminal device which has logged in with the first account, log-in request processing unit 31 can permit another log-in request.

Figure 13:
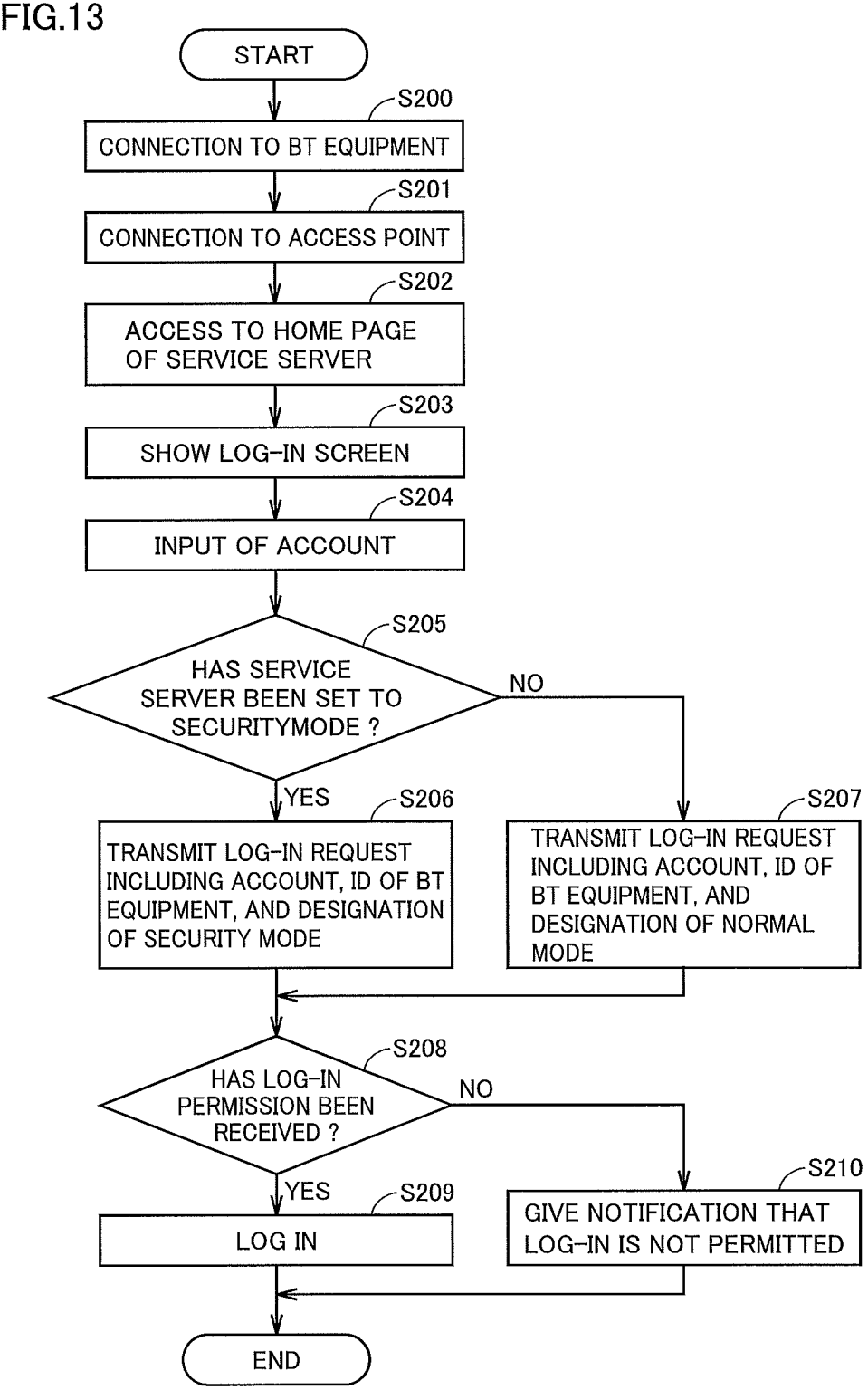
FIG. 13 is a flowchart showing a log-in procedure in the terminal device in the third embodiment.

FIG. 13 is a flowchart showing a log-in procedure in terminal device 10 in the third embodiment.

Referring to FIG. 13, in step S200, second communication unit 16 can establish connection for communication with BT equipment 22. Second communication unit 16 can obtain an ID of connected BT equipment 22. An ID of BT equipment 22 is configured, for example, with a media access control (MAC) address.

In step S201, first communication unit 14 can establish connection for communication with access point 21.

In step S202, log-in processing unit 13 can obtain a log-in screen by accessing a home page of the service server.

In step S203, log-in processing unit 13 can have display 11 show a log-in screen.

In step S204, log-in processing unit 13 can accept an input of an account from a user through input unit 12.

When the security mode has been set in step S205, the process proceeds to step S206, and when the normal mode has been set, the process proceeds to step S207.

In step S206, log-in processing unit 13 can transmit a log-in request including the account input by the user, the ID of BT equipment 22, and designation of the security mode to service server 30 through first communication unit 14 via access point 21.

In step S207, log-in processing unit 13 can transmit a log-in request including the account input by the user, the ID of BT equipment 22, and designation of the normal mode to service server 30 through first communication unit 14 via access point 21.

In step S208, when log-in processing unit 13 receives through first communication unit 14, a log-in permission notification transmitted from service server 30 via access point 21, the process proceeds to step S209. When log-in processing unit 13 receives through first communication unit 14, a log-in rejection notification transmitted from service server 30 via access point 21, the process proceeds to step S210.

In step S209, log-in processing unit 13 can log in service server 30 and can have display 11 show success in log-in.

In step S210, log-in processing unit 13 can have display 11 show failure in log-in.

Figure 14:
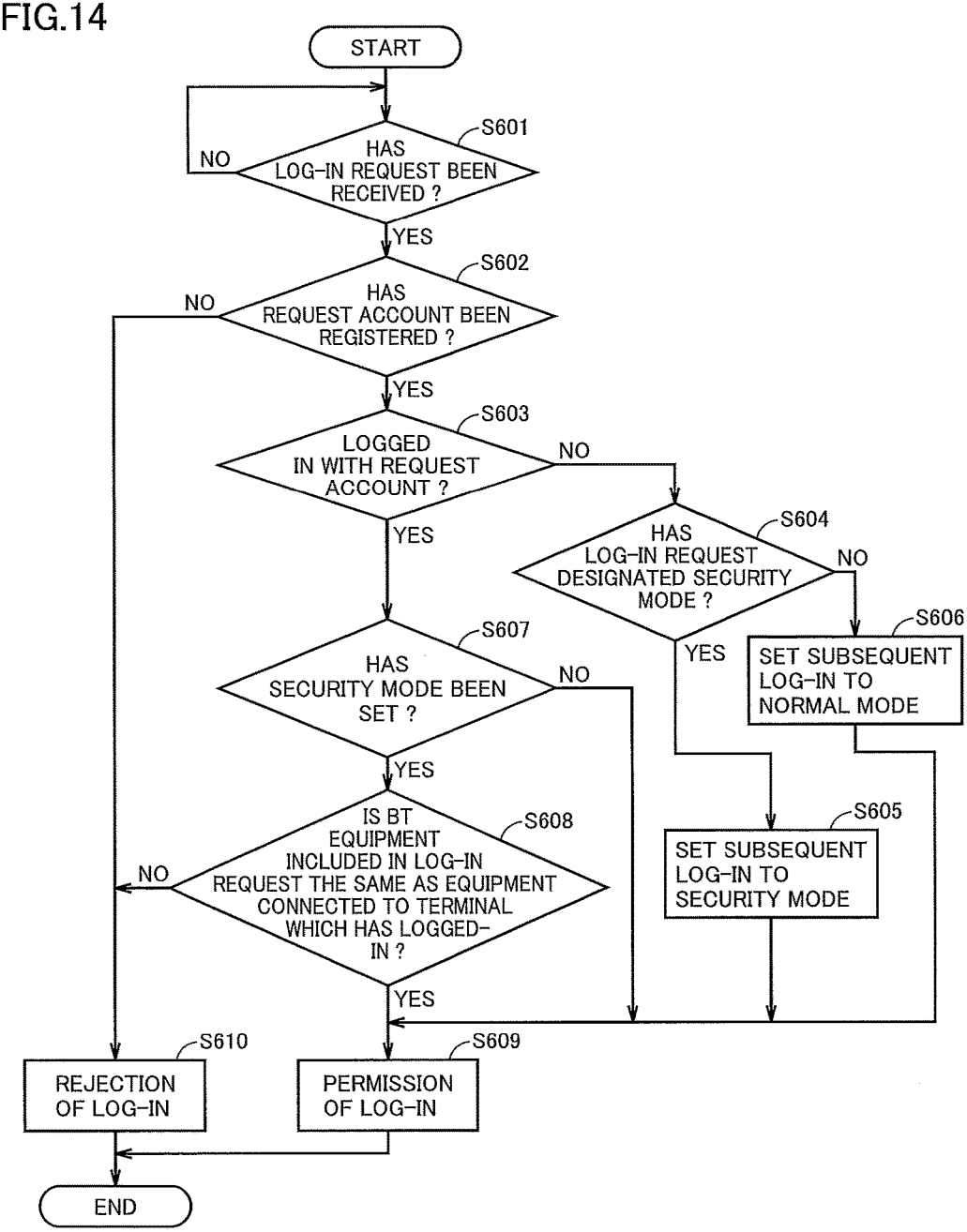
FIG. 14 is a flowchart showing a procedure for processing of a log-in request in the service server in the third embodiment.

FIG. 14 is a flowchart showing a procedure for processing of a log-in request in service server 30 in the third embodiment.

In step S601, when log-in request processing unit 31 receives through communication unit 34, a log-in request transmitted from terminal device 10 via access point 21, the process proceeds to step S602.

When an account included in the received log-in request (hereinafter a request account) is stored in registered account storage unit 33 in step S602, log-in request processing unit 31 allows the process to proceed to step S603, and when the request account is not stored in registered account storage unit 33, it allows the process to proceed to step S610.

When log-in with the request account has already been successful (hereinafter in the log-in state) in step S603, log-in request processing unit 31 can allow the process to proceed to step S607, and when not in the log-in state, it can allow the process to proceed to step S604.

In step S604, when the received log-in request includes designation of the security mode, log-in request processing unit 31 allows the process to proceed to step S605, and when the received log-in request includes designation of the normal mode or does not include designation of a mode, it allows the process to proceed to step S606.

In step S605, log-in request processing unit 31 can set a subsequent mode to the security mode. Thereafter, the process proceeds to step S609.

In step S606, log-in request processing unit 31 can set a subsequent mode to the normal mode. Thereafter, the process proceeds to step S609.

When the security mode is currently set in step S607, the process proceeds to step S608. When the normal mode is currently set, the process proceeds to step S609.

In step S608, when an ID of BT equipment included in the log-in request is the same as the ID of the BT equipment included in the log-in request from the terminal device which has logged in with the request account, the process proceeds to step S609, and when it is not the same, the process proceeds to step S610.

In step S609, log-in request processing unit 31 can permit log-in of the terminal device which has transmitted the log-in request and can transmit through communication unit 34, a log-in permission notification to terminal device 10 via access point 21.

In step S610, log-in request processing unit 31 can reject log-in of the terminal device which has transmitted the log-in request, and can transmit through communication unit 34, a log-in rejection notification to terminal device 10 via access point 21.

As set forth above, according to the third embodiment, unauthorized log-in to a service server with an account leaked from a terminal device not connected to BT equipment or from a terminal device connected to BT equipment different from BT equipment to which a terminal device used by an authorized user is connected while the authorized user has logged in the service server can be prevented. Thus, as in the first embodiment, takeover by an unauthorized user of a social networking service can be prevented.

Fourth Embodiment

A fourth embodiment results from exclusion of mode setting from the third embodiment.

Figure 15:
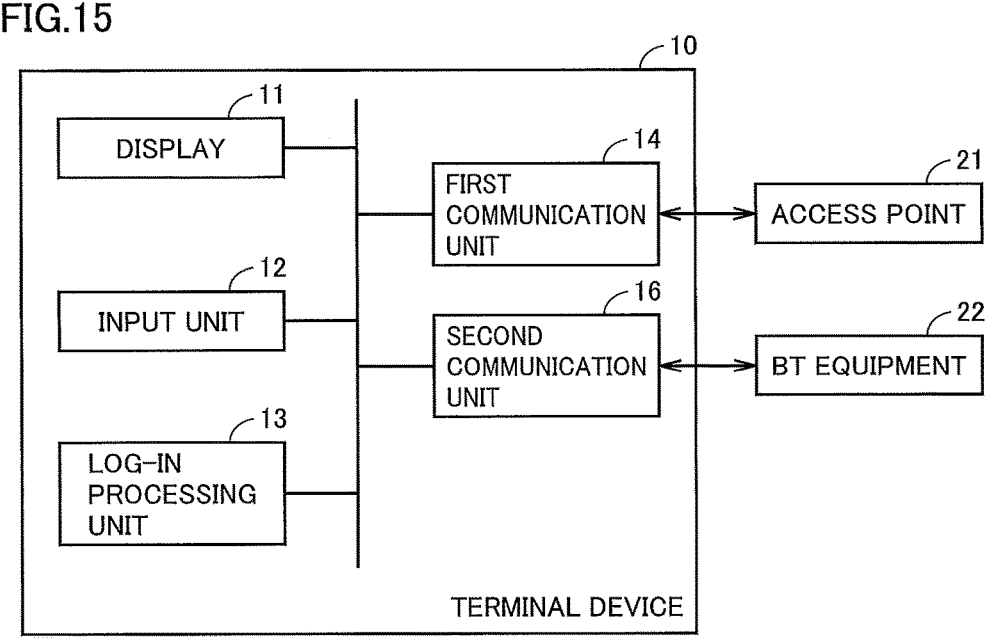
FIG. 15 is a diagram showing a configuration of the terminal device in a fourth embodiment.

FIG. 15 is a diagram showing a configuration of terminal device 10 in the fourth embodiment.

Referring to FIG. 15, terminal device 10 includes display 11, input unit 12, log-in processing unit 13, first communication unit 14, and second communication unit 16. Log-in processing unit 13 can be implemented by at least one processor such as a CPU executing programs restored in a memory.

Display 11 can show a result of a log-in request.

Input unit 12 can accept an input from a user.

First communication unit 14 can establish connection for communication with access point 21 and can communicate with service server 30 through access point 21 and the Internet 2.

Second communication unit 16 can establish connection for communication with BT equipment 22 and can communicate with BT equipment 22 under the Bluetooth technology.

Log-in processing unit 13 can transmit a log-in request including an account and an ID of connected BT equipment 22 to service server 30 via access point 21. When log-in processing unit 13 receives permission of the log-in request from service server 30 via access point 21, it can log in service server 30.

Communication unit 34 of service server 30 in the fourth embodiment can communicate with terminal device 10 through the Internet 2 and access point 21.

Log-in request processing unit 31 of service server 30 in the fourth embodiment can permit or reject a log-in request from terminal device 10. Log-in request processing unit 31 can receive a log-in request including an account and an ID of BT equipment from terminal device 10 via access point 21 and the Internet 2. When a first account included in the received log-in request is stored in registered account storage unit 33 and service server 30 is not logged in with the first account, log-in request processing unit 31 can permit the log-in request. When an ID of BT equipment included in another log-in request including an account the same as the first account is the same as the ID of the BT equipment included in the log-in request from the terminal device which has logged in with the first account, log-in request processing unit 31 can permit another log-in request.

Figure 16:
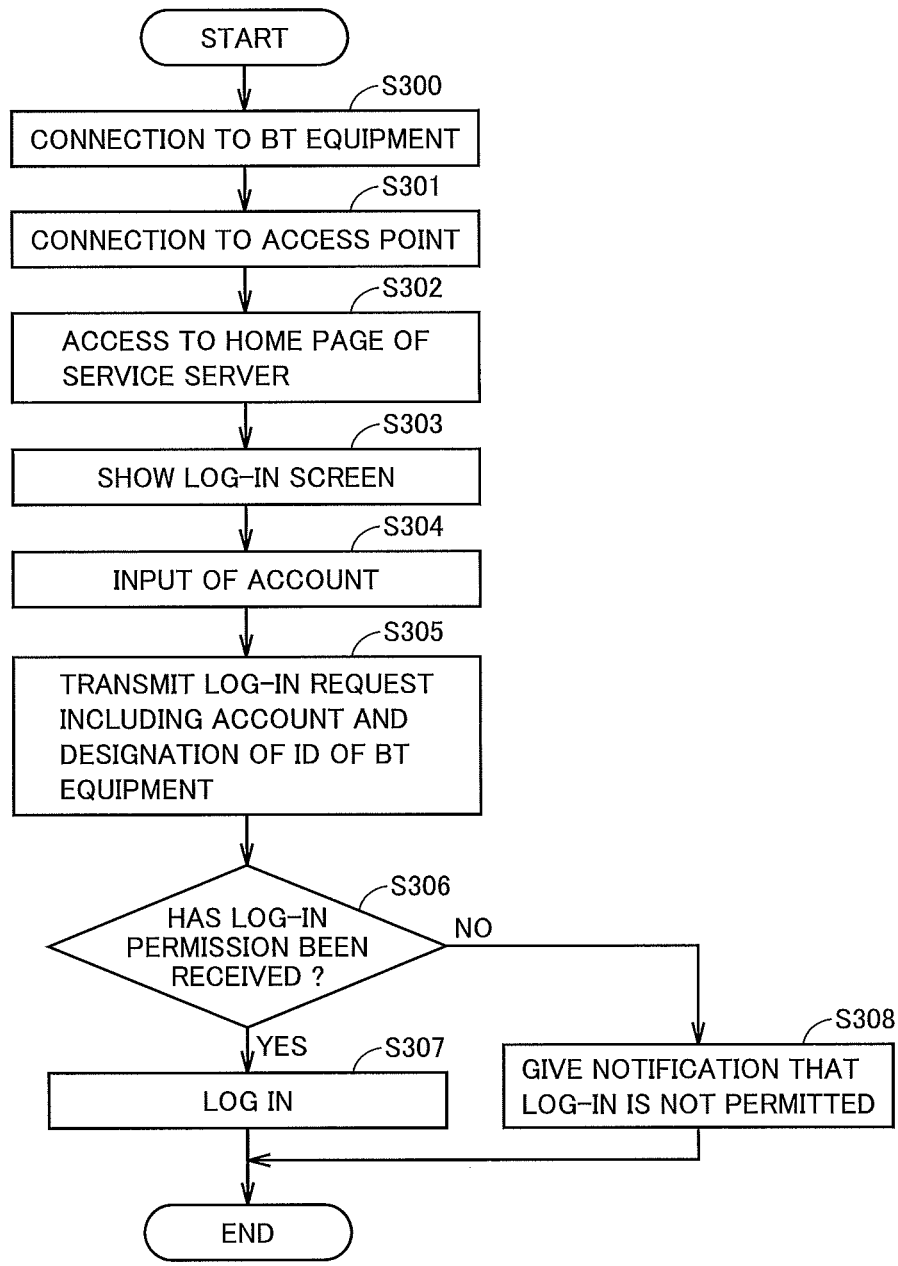
FIG. 16 is a flowchart showing a log-in procedure in the terminal device in the fourth embodiment.

FIG. 16 is a flowchart showing a log-in procedure in terminal device 10 in the fourth embodiment.

Referring to FIG. 16, in step S300, second communication unit 16 can establish connection for communication with BT equipment 22. Second communication unit 16 can obtain an ID of connected BT equipment 22.

In step S301, first communication unit 14 establishes connection for communication with access point 21.

In step S302, log-in processing unit 13 can obtain a log-in screen by accessing a home page of the service server.

In step S303, log-in processing unit 13 can have display 11 show a log-in screen.

In step S304, log-in processing unit 13 can accept an input of an account from a user through input unit 12.

In step S305, log-in processing unit 13 can transmit a log-in request including the account input by the user and the ID of BT equipment 22 to service server 30 through first communication unit 14 via access point 21.

In step S306, when log-in processing unit 13 receives through communication unit 14, a log-in permission notification transmitted from service server 30 via access point 21, the process proceeds to step S307. When log-in processing unit 13 receives through communication unit 14, a log-in rejection notification transmitted from service server 30 via access point 21, the process proceeds to step S308.

In step S307, log-in processing unit 13 can log in service server 30 and can have display 11 show success in log-in.

In step S308, log-in processing unit 13 can have display 11 show failure in log-in.

Figure 17:
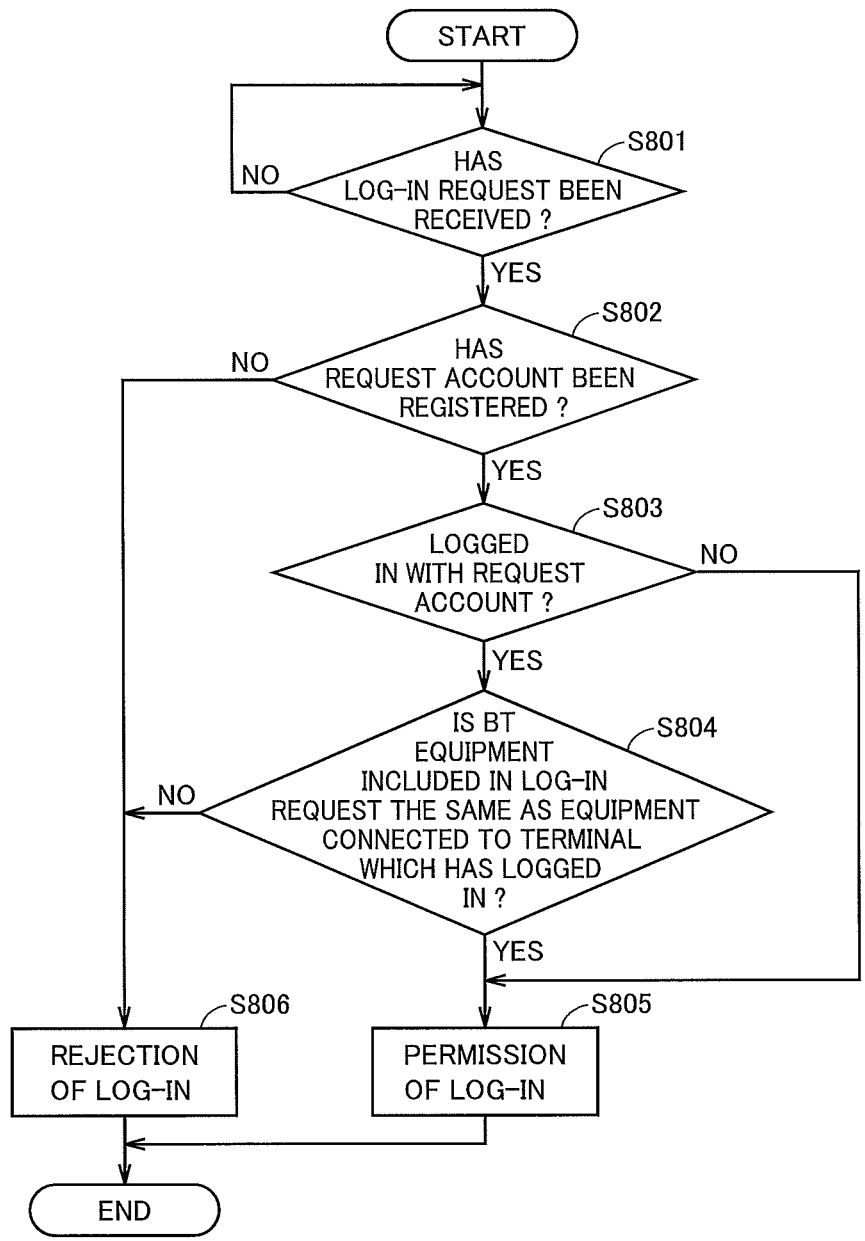
FIG. 17 is a flowchart showing a procedure for processing of a log-in request in the service server in the fourth embodiment.

FIG. 17 is a flowchart showing a procedure for processing of a log-in request in service server 30 in the fourth embodiment.

In step S801, when log-in request processing unit 31 receives through communication unit 34, a log-in request transmitted from terminal device 10 via access point 21, the process proceeds to step S802.

When an account included in the received log-in request (hereinafter a request account) is stored in registered account storage unit 33 in step S802, log-in request processing unit 31 allows the process to proceed to step S803, and when the request account is not stored in registered account storage unit 33, it allows the process to proceed to step S806.

When log-in with the request account has already been successful (hereinafter in the log-in state) in step S803, log-in request processing unit 31 can allow the process to proceed to step S804, and when not in the log-in state, it can allow the process to proceed to step S805.

In step S804, when an ID of BT equipment included in the log-in request is the same as the ID of the BT equipment included in the log-in request from the terminal device which has logged in, the process proceeds to step S805, and when it is not the same, the process proceeds to step S806.

In step S805, log-in request processing unit 31 can permit log-in of the terminal device which has transmitted the log-in request, and can transmit through communication unit 34, a log-in permission notification to terminal device 10 via access point 21.

In step S806, log-in request processing unit 31 can reject log-in of the terminal device which has transmitted the log-in request, and can transmit through communication unit 34, a log-in rejection notification to terminal device 10 via access point 21.

As set forth above, according to the fourth embodiment, as in the third embodiment, unauthorized log-in to a service server with an account leaked from a terminal device not connected to BT equipment or from a terminal device connected to BT equipment different from BT equipment to which a terminal device used by an authorized user is connected while the authorized user has logged in the service server can be prevented. Furthermore, according to the fourth embodiment, use by an unauthorized user can be prevented without designation of a mode being included in a log-in request.

Fifth Embodiment

In a fifth embodiment, the service server stores an ID of BT equipment in addition to an account of a registered user, and the service server can determine whether or not to permit a log-in request based on whether or not an account and an ID of BT equipment included in a log-in request are stored.

Since terminal device 10 in the fifth embodiment is the same as in the fourth embodiment, description thereof will not be repeated.

The service server in the fifth embodiment can check whether or not BT equipment has been registered in the service server, regardless of whether or not it is logged in.

Registered account storage unit 33 of service server 30 in the fifth embodiment stores a combination of an account of a registered user and an ID of BT equipment corresponding to the account.

Log-in request processing unit 31 of service server 30 in the fifth embodiment can receive a log-in request including an account and an ID of connected BT equipment from a terminal device.

When a combination of the account and the ID of the BT equipment included in the received log-in request is stored in registered account storage unit 33, log-in request processing unit 31 can permit a log-in request.

Figure 18:
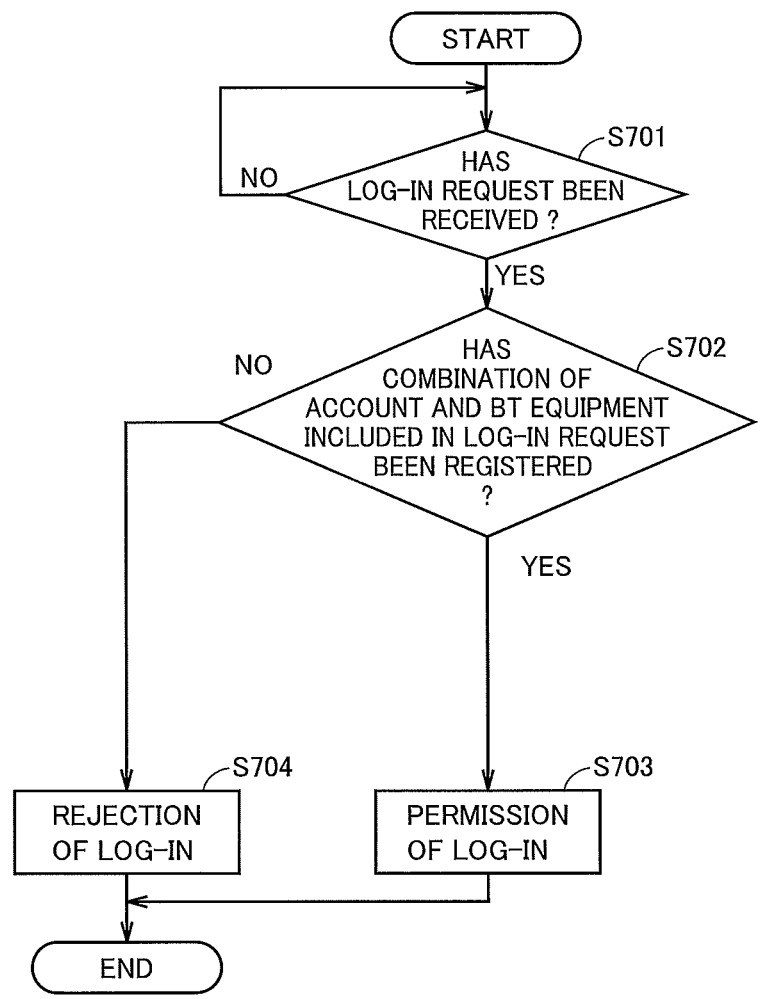
FIG. 18 is a flowchart showing a procedure for processing of a log-in request in the service server in a fifth embodiment.

FIG. 18 is a flowchart showing a procedure for processing of a log-in request in service server 30 in the fifth embodiment.

In step S701, when log-in request processing unit 31 receives through communication unit 34, a log-in request transmitted from terminal device 10 via access point 21, the process proceeds to step S702.

When a combination of an account and BT equipment included in the log-in request is stored in registered account storage unit 33 in step S702, the process proceeds to step S703, and when it is not registered, the process proceeds to step S704.

In step S703, log-in request processing unit 31 can permit log-in of the terminal device which has transmitted the log-in request, and can transmit through communication unit 34, a log-in permission notification to terminal device 10 via access point 21.

In step S704, log-in request processing unit 31 can reject log-in of the terminal device which has transmitted the log-in request, and can transmit through communication unit 34, a log-in rejection notification to terminal device 10 via access point 21.

As set forth above, according to the third embodiment, regardless of whether or not an authorized user has logged in the service server, a log-in request not including a combination of an account and BT equipment which has been registered in the service server can be rejected. Thus, unauthorized log-in to the service server with a leaked account can be prevented.

(Modification)

The present disclosure is not limited to embodiments above, and includes, for example, a modification as below.

(1) Near Field Communication Equipment

Though BT equipment which communicates with a terminal device under the Bluetooth technology is employed as near field communication equipment in the third to fifth embodiments, limitation thereto is not intended. For example, instead of BT equipment, NFC equipment which communicates with a terminal device under the near field communication (NFC) technology may be employed. NFC equipment may be implemented, for example, by a credit card.

Figure 19:
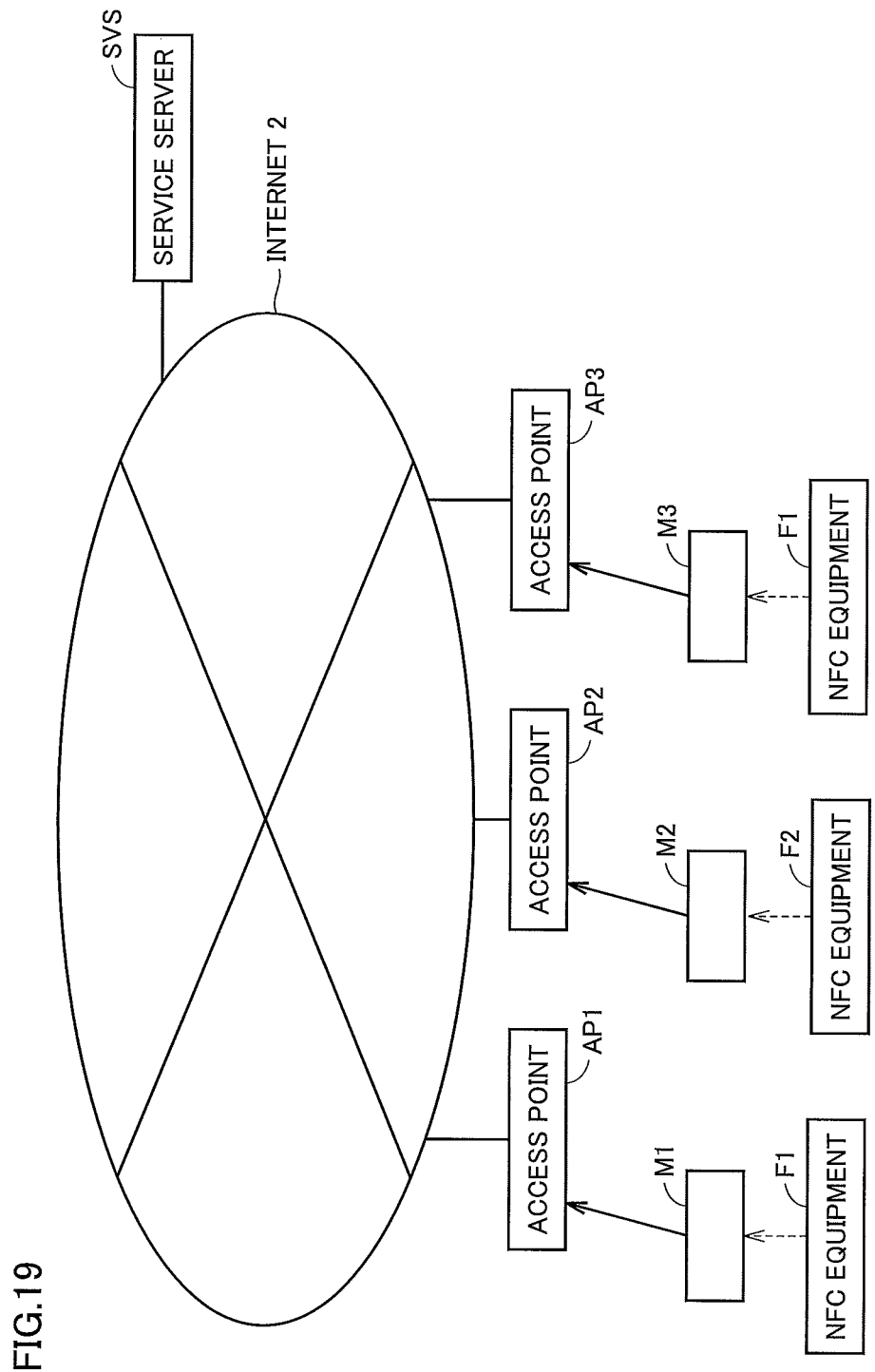
FIG. 19 is a diagram for illustrating processing of a log-in request from the terminal device in a modification.

FIG. 19 is a diagram for illustrating processing of a log-in request from the terminal device in the modification.

As shown in FIG. 19, service server SVS and Wi-Fi access points AP1 and AP2 are connected to the Internet 2. Terminal devices M1, M2, and M3 have the same account AC and request for log-in to service server SVS.

An authorized user holds NFC equipment F1 and an unauthorized user holds NFC equipment F2. A combination of account AC and an ID of NFC equipment F1 is registered in service server SVS.

In such a situation, a log-in request is permitted and rejected as below.

When an authorized user who holds NFC equipment F1 requests for log-in to service server SVS from terminal device M1 in his/her house, a log-in request is permitted because a combination of account AC and an ID of NFC equipment F1 is registered in service server SVS.

When the authorized user who holds NFC equipment F1 requests for log-in to service server SVS from terminal device M3 at a location different from his/her house, the log-in request is permitted because the combination of account AC and the ID of NFC equipment F1 is registered in service server SVS.

When an unauthorized user who holds NFC equipment F2 requests for log-in to service server SVS from terminal device M2, the log-in request is rejected because a combination of account AC and an ID of NFC equipment F2 is not registered in service server SVS.

Although embodiments have been described, it should be understood that embodiments disclosed herein are illustrative and non-restrictive in every respect. The scope of the present disclosure is defined by the terms of the claims and is intended to include any modifications within the scope and meaning equivalent to the terms of the claims.

The invention claimed is:

1. A terminal device configured to log-in to an account registered with a service server, the terminal device comprising:
   a communication unit configured to establish a connection for communication with the service server via a relay device; and
   at least one processor configured to set a normal mode or a security mode for an access to the service server,
   the at least one processor being configured to cause the communication unit to transmit a log-in request including an account and designation of the security mode to the service server via the relay device when the security mode is set and to transmit a log-in request including an account and designation of the normal mode to the service server via the relay device when the normal mode is set,
   the at least one processor being configured to cause the communication unit to establish communications with the service server via the relay device when permission of the log-in request is received from the service server via the relay device, wherein
   when the security mode is set and the service server has granted a first log-in request to a first account and a second log-in request to the first account is received by the service server, the service server is configured to permit the second log-in request when the second log-in request passes via a relay device that was used to pass the first log-in request, and reject the second log-in request when the second log-in passes via a relay device that is different from the relay device used to pass the first log-in request, and
   when the normal mode is set and the service server has granted the first log-in request to the first account and the second log-in request to the first account is received by the service server, the service server is configured to permit the second log-in request regardless of whether the relay device used to pass the second log-in request is the same as that used to pass the first log-in request.

2. The terminal device according to claim 1, wherein the relay device comprises a Wi-Fi access point under IEEE 802.11.

3. The terminal device according to claim 1, wherein the relay device comprises a base station for portable telephones.

4. The terminal device according to claim 1, wherein the service server comprises a server for a social networking service.

5. A terminal device configured to log-in to an account registered with a service server, the terminal device comprising:
   a first communication unit configured to establish connection for communication with the service server via a relay device;
   a second communication unit configured to establish connection for communication with near field communication equipment; and at least one processor configured to set a normal mode or a security mode for an access to the service server and to cause the first communication unit to transmit to the service server, a log-in request including an account and designation of an identifier of near field communication equipment connected via the second communication unit, the at least one processor being configured to cause the first communication unit to establish communications with the service server when permission of the log-in request is received from the service server, wherein when the security mode is set and the service server has granted a first log-in request to a first account and a second log-in request to the first account is received by the service server, the service server is configured to permit the second log-in request when an identifier of a near field communication equipment included in the second log-in request is the same as that included in the first log-in request, and reject the second log-in request when the identifier of the near field communication equipment included in the second log-in request is different from that included in the first log-in request, and when the normal mode is set and the service server has granted the first log-in request to the first account and the second log-in request to the first account is received by the service server, the service server is configured to permit the second log-in request regardless of whether the identifier of the near field communication equipment included in the second log-in request is the same as that included in the first log-in request.

6. The terminal device according to claim 5, wherein the at least one processor is configured to cause the first communication unit to transmit a log-in request including the account, the identifier of the near field communication equipment connected via the second communication unit, and designation of the security mode to the service server when the security mode is set and to transmit a log-in request including the account, designation of the identifier of the near field communication equipment connected via the second communication unit, and designation of the normal mode to the service server when the normal mode is set, and when the service server is not logged in with the first account, a log-in request including the first account and designation of the security mode is permitted by the service server and the service server is set to the security mode.

7. The terminal device according to claim 5, wherein the near field communication equipment comprises equipment which communicates with the terminal device under Bluetooth technology.

8. The terminal device according to claim 5, wherein the near field communication equipment comprises equipment which communicates with the terminal device under near field communication (NFC) technology.

9. The terminal device according to claim 5, wherein the service server comprises a server for a social networking service.

* * * * *